3,547,543
DEVICE FOR MEASURING THE REFLECTION COEFFICIENT, THE DIELECTRIC CONSTANT OR THE THICKNESS OF FOILS OR PLATES
Günter Schulten, Wedel, Germany, assignor, by mesne assignments, to U.S. Philips Corporation, New York, N.Y., a corporation of Delaware
Filed Nov. 7, 1967, Ser. No. 681,455
Claims priority, application Germany, Nov. 26, 1966, P 40,885
Int. Cl. G01b 9/02
U.S. Cl. 356—108
9 Claims

ABSTRACT OF THE DISCLOSURE

A device for measuring the dielectric constant or the thickness of a sheet of dielectric material comprises a microwave ring resonator including at least three mirrors relatively disposed so as to set up a circulating electromagnetic wave within the resonator. Microwave energy is coupled into the ring resonator by means of a semitransparent mirror. The sheet of dielectric material is placed in the ring resonator perpendicular to the energy propagation path thereby splitting the wave into two oscillation modes (CW and CCW) having different resonant frequencies. The difference between these two frequencies is a function of the reflection coefficient of the dielectric heat. Since the reflection coefficient is transformed directly into a frequency value, it can be measured with great accuracy by means of a simple detector circuit.

---

The present invention relates to microwave measuring apparatus and more particularly to a device for measuring the reflection coefficient, the dielectric constant or the thickness of low-loss or no-loss sheets, foils or layers (plastic foils, paper, cardboard or the like) by means of electromagnetic waves.

The invention is based on the following principle. On normal incidence of an electromagnetic wave (a microwave, an infrared wave or a light wave) on a planoparallel plate consisting of a material which absorbs the wave little or not at all, part of the wave is reflected and part is transmitted. The reflection coefficient R and the transmission coefficient T depend upon the materials dielectric constant $\epsilon$, upon the thickness of the plate and upon the wavelength $\lambda$. In no-loss materials $|R|^2+|T|^2=1$ and in low-loss materials it is slightly less than 1. Hence, with a known wavelength the dielectric constant $\epsilon$ can be determined by measuring the reflection coefficient R, provided that the thickness of the plate is known. On the other hand the thickness of the plate may be determined if the dielectric constant $\epsilon$ of the material is known.

The invention consists in that the material to be investigated is arranged in a microwave optical ring resonator comprising at least three mirrors so that it is placed at right angles to the propogation path of the electromagnetic waves circulating in the ring resonator, means being provided for producing, coupling out and indicating the circulating waves.

In order that the invention may readily be carried into effect, embodiments thereof will now be described, by way of example, with reference to the accompanying diagrammatic drawings, in which.

Figure 1:
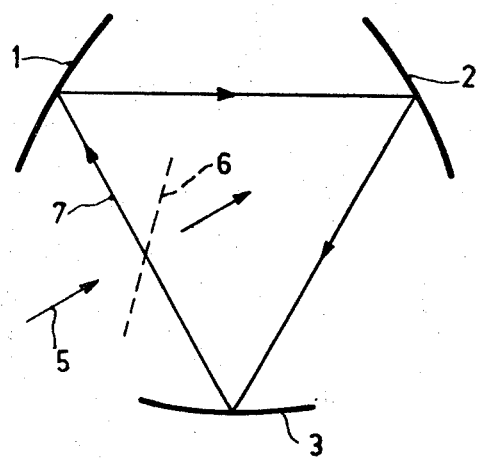
FIG. 1 shows a ring-resonator comprising three mirrors.
Figure 2:
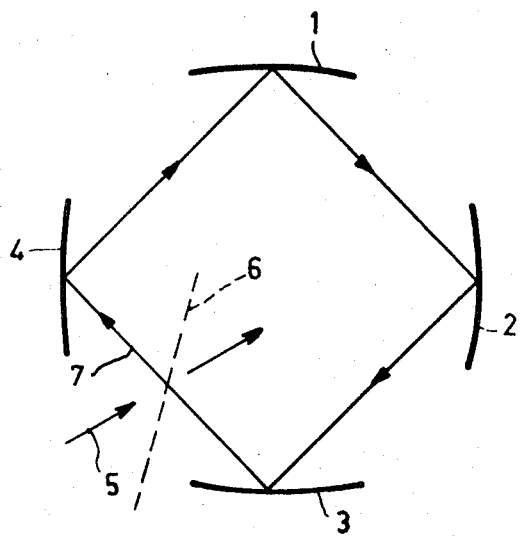
FIG. 2 shows a ring-resonator comprising four mirrors.

The ring resonator shown in FIG. 1 comprises three mirrors 1, 2 and 3 and the ring resonator shown in FIG. 2 comprises four mirrors 1, 2, 3 and 4.

A wave 5 emanating from a microwave source (not shown in FIGS. 1 and 2) is coupled into the ring resonator comprising three (four) mirrors 1, 2, 3, (4) via a partly transparent mirror 6 arranged at a particular angle in the ray path. The coupled-in wave 7 now circulates in the resonator in the direction indicated by the arrow. Resonance is produced when the path length of the wave 7 is an integral multiple of the wavelength.

The use of optical ring resonators of the type shown in FIGS. 1 and 2 for determining the reflection coefficient, the dielectric constant or the thickness of a sheet, foil or the like is based on the following theory.

In many physical systems which exhibit resonance (mechanical vibrators, electrical resonant circuits, cavity resonators, atoms and molecules) degeneracy occurs. This means that resonance may occur in two or more modes of oscillation at the same frequency. This is referred to as double or multiple degeneracy. An interesting property of a ring resonator is its degeneracy with respect to the propagation direction of the wave. The wave can circulate clockwise and counterclockwise. Normally only one wave is excited, but if two such modes of oscillation are coupled (e.g. by placing a dielectric sheet in the wave path) i.e., when energy stored in one mode of oscillation is allowed to pass into the other mode of oscillation, this gives rise to so-called splitting. The oscillation modes of the coupled system no longer have the same resonancy frequency as the individual oscillation modes, but the new system exhibits two different resonant frequencies. This is referred to as double (or multiple) splitting. The spacing between the two new resonant frequencies is a measure of the degree of coupling. These two frequencies correspond to different standing wave patterns. In one case the dielectric sheet lies in the plane of maximum electric field (lower frequency) and in the other case it lies in a plane of minimum electric field (higher frequency). In the ring resonator shown in FIG. 3, the two mutually degenerate oscillation modes which are to be utilized are the two fundamental oscillation modes ($TEM_{ooq}$) which differ in the direction of circulation (clockwise or counter-clockwise) in the resonator. Additional information relating to microwave optical ring resonators can be found in an article in the "IEEE Transactions on Microwave Theory and Techniques," vol. MTT-15, No. 1, January 1967, pp. 54–55, entitled "Microwave Optical Ring Resonators."

A plano-parallel dielectric plate 8 (FIG. 3) arranged perpendicularly to the direction of propagation of the circulating wave produces a coupling of the two fundamental oscillation modes on account of its reflection coefficient R, and hence gives rise to the aforesaid splitting. According to theory, the relative spacing of the two resonance frequencies is given by $$\frac{\Delta\omega}{\omega}=\frac{\lambda}{\pi L}\arctan\sqrt{\frac{R^2-p^2}{(1-|R|^2)(1+p^2)}}$$

$$\approx \frac{\lambda R}{\pi L} \text{ for } p \leq R \leq 1$$

where

R=the reflection coefficient of the plate,
$p=\pi L/\lambda Q$
L=the length of the periphery of the triangle ABC,
$\lambda$=the wavelength of the radiation coupled in,
Q=the Q-factor of the ring resonator without the plate,
$\Delta\omega$=the difference between the two resonant frequencies (magnitude of the splitting),
$\omega$=the resonance frequency in the absence of splitting.

The quantity $p$ has the following meaning: only at a sufficient value of the Q-factor can the two resonant frequencies be resolved. Consequently, two frequencies can only be observed if $|R|>p$. Otherwise the resonance would only become wider.

The device in accordance with the invention is based on the above principle which enables the thickness or the dielectric constant of sheets, layers or foils to be measured continuously and without physical contact by converting the quantity to be measured into a frequency difference. In other words, the reflection coefficient is transformed directly into a frequency which can be measured with high precision.

Figure 3:
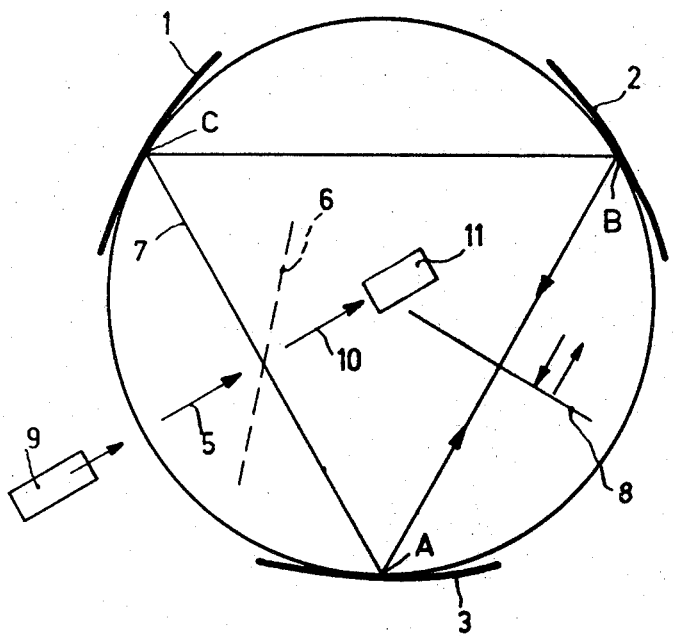
FIG. 3 shows a device in accordance with the invention which includes a three-mirror ring resonator.

In addition to the mirrors 1, 2 and 3, the wave 5, the partly transparent mirror 6, the circulating wave 7 and the material 8 to be investigated, FIG. 3, which illustrates a device in accordance with the invention, shows a microwave energy source 9, a wave 10 coupled out through the mirror 6 and a detector 11 which receives this wave.

The difference of the two resonance frequencies is measured as follows:

The detector (a rectifier diode detector circuit, a bolometer, a photodiode or the like) indicates the intensity of the incident output wave. With the sample material 8 removed the frequency of the input wave 5 is changed (for example, by hand or by wobbling the transmitter frequency) until the detector output is a maximum. The resonance of the ring resonator initially results in a decrease in intensity of the wave at the detector. The dielectric sample 8 is then inserted in the ring resonator and the transmitter frequency varied to determine the two new frequencies at which the detector produces a maximum output signal. The difference between these two frequencies is determined to derive the reflection coefficient from which the dielectric constant or the thickness of the sample may be determined, provided that the other is known. Thus the two resonance frequencies and hence their difference may be measured successively. With suitable modulation of the transmitter to produce sidebands, the two output resonance frequencies may be measured simultaneously.

Such a measuring device can be constructed for waves having wavelengths between $\lambda \approx 3$ cms. (microwaves) and $\lambda \approx 3 \times 10^{-5}$ cms. (light waves).

The ring resonator described need not be a passive element. It may also be designed as an active element by the provision of a medium capable of stimulated emission (a laser) in the path of the circulating wave 7. This brings the ring resonator to self-excitation. This means that in the case of resolution the resonator resonates at two frequencies. By mixing these two frequencies, for example, with a photodiode, the difference frequency $\Delta \omega$ is directly produced.

What is claimed is:

1. A device for measuring the reflection coefficient, the dielectric constant or the thickness of a low-loss sheet of dielectric material by means of electromagnetic radiation comprising, a microwave ring-resonator including at least three mirrors relatively disposed so as to set up circulating electromagnetic waves within the ring resonator, said dielectric material being placed at right angles to the propagation path of the electromagnetic waves circulating in the ring-resonator, means for producing said circulating waves in the ring resonator, and means for coupling out and indicating the circulating waves.

2. A device as claimed in claim 1, wherein the means for producing the circulating wave comprises an external source of microwave energy and a partly transparent mirror arranged at a particular angle in the propagation path of the circulating wave.

3. A device as claimed in claim 1 wherein the means for producing the circulating wave includes a medium capable of stimulated emission which is arranged within the resonator in the path of the circulating wave.

4. A device as claimed in claim 1 wherein the means for coupling out the wave comprises a partly transparent mirror arranged at a particular angle in the propagation path of the circulating wave.

5. A device as claimed in claim 1 wherein said indicating means includes a detector positioned so as to indicate the waves coupled out.

6. A device as claimed in claim 1 wherein said means for producing and coupling out the circulating waves comprises, an external source of electromagnetic energy directed towards said ring resonator, and a partly transparent mirror arranged within the resonator at a given angle in the path of the circulating waves which serves both to couple in and to couple out the wave.

7. A microwave measuring device for a sheet of low loss dielectric material comprising, at least three mirrors relatively disposed to form a microwave optical ring resonator, means for causing an electromagnetic wave to circulate in the ring resonator, said dielectric sheet being placed within said resonator at right angles to the propagation path of the circulating electromagnetic wave so as to split the wave into two oppositely circulating waves of different frequencies related to the reflection coefficient of said sheet, and means for detecting the circulating waves to provide an indication of the material reflection coefficient.

8. A device as claimed in claim 7 wherein said means for causing a circulating wave comprises, an external source of electromagnetic energy, and a partly transparent mirror arranged within the resonator at a given angle in the path of the wave energy radiated by said energy source and in the propagation path of the circulating waves.

9. A device as claimed in claim 8 wherein said mirror is positioned between said energy source and said detecting means.

References Cited

UNITED STATES PATENTS 3,480,878  11/1969  Macek _____ 356—106X

RONALD L. WIBERT, Primary Examiner

C. CLARK, Assistant Examiner